(12) United States Patent
Shoji et al.

(10) Patent No.: US 11,269,074 B2
(45) Date of Patent: Mar. 8, 2022

(54) ELECTRO-OPTICAL DISTANCE METER AND ELECTRO-OPTICAL DISTANCE MEASUREMENT METHOD

(71) Applicant: TOPCON CORPORATION, Tokyo (JP)

(72) Inventors: Naoki Shoji, Tokyo (JP); Masae Matsumoto, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 156 days.

(21) Appl. No.: 16/544,846

(22) Filed: Aug. 19, 2019

(65) Prior Publication Data

US 2020/0072977 A1    Mar. 5, 2020

(30) Foreign Application Priority Data

Aug. 30, 2018 (JP) .............................. JP2018-161773

(51) Int. Cl.
*G01C 3/08* (2006.01)
*G01S 17/26* (2020.01)
*G01S 7/487* (2006.01)

(52) U.S. Cl.
CPC ............ *G01S 17/26* (2020.01); *G01S 7/4876* (2013.01)

(58) Field of Classification Search
CPC ................................ G01S 17/26; G01S 7/4876
See application file for complete search history.

(56) References Cited

U.S. PATENT DOCUMENTS 10,845,474 B1 *  11/2020  Riley .................... G01S 15/102
2016/0259039 A1   9/2016  Ohtomo et al.
2018/0081043 A1   3/2018  Demirtas et al.
(Continued)

FOREIGN PATENT DOCUMENTS

EP    3064962 A1    9/2016
JP    2016-161411 A   9/2016

OTHER PUBLICATIONS

Extended European Search Report dated Jan. 27, 2020, in connection with European Patent Application No. 19193339.9, filed Aug. 23, 2019, 9 pgs.
(Continued)

*Primary Examiner* — Mark Hellner
(74) *Attorney, Agent, or Firm* — Chiesa Shahinian & Giantomasi PC

(57) ABSTRACT

An electro-optical distance measurement method includes: a light emitting step of switchably outputting a first distance measuring light and a second distance measuring light; a photodetection step of receiving a first reflected distance measuring light and a second reflected distance measuring light; an arithmetic step of frequency-converting a photodetection signal to generate a first difference frequency signal and a second difference frequency signal; and a determining step of determining whether identification information indicating a host device is included in the photodetection signal, wherein the light emitting step involves driving a light emitting element so that the identification information is included in a light emission signal, and the arithmetic step involves calculating the distance value when it is determined in the determining step that the identification information is included in the photodetection signal.

5 Claims, 6 Drawing Sheets

(56) References Cited

U.S. PATENT DOCUMENTS

2018/0238998 A1 8/2018 Dussan et al.
2019/0056497 A1* 2/2019 Pacala .................. G01S 7/4865

OTHER PUBLICATIONS

Communication pursuant to Article 94(3) dated Nov. 2, 2021, in connection with European Patent Application No. 19193339.9, 7 pgs.

* cited by examiner

ELECTRO-OPTICAL DISTANCE METER AND ELECTRO-OPTICAL DISTANCE MEASUREMENT METHOD

CROSS-REFERENCE TO RELATED APPLICATIONS

This application is based upon and claims benefit of priority from Japanese Patent Application No. 2018-161773, filed Aug. 30, 2018, the entire contents of which are incorporated herein by reference.

TECHNICAL FIELD

The present invention relates to an electro-optical distance meter and an electro-optical distance measurement method.

BACKGROUND

Conventionally, an electro-optical distance meter in which a light emitting element emits light while switching intermittent modulated distance measuring signals obtained by pulsing a plurality of adjacent frequencies for respective adjacent frequencies and a photodetection element receives a reflected distance measuring signal from a measurement target object has been known (for example, see Japanese Patent Application Publication No. 2016-161411).

The electro-optical distance meter disclosed in Japanese Patent Application Publication No. 2016-161411 obtains the phases of the photodetection signals corresponding to a plurality of adjacent frequencies to calculate a precise distance value, calculates a coarse measurement distance value from the phase difference of the respective photodetection signals, and measures a distance by combining the coarse measurement distance value and the precise measurement distance value.

SUMMARY

However, in the electro-optical distance meter disclosed in Japanese Patent Application Publication No. 2016-161411, when another electro-optical distance meter is disposed at an adjacent position, the electro-optical distance meter may receive the distance measuring light emitted by the other adjacent electro-optical distance meter. Particularly, a measurement target object is not a recursive reflector such as a prism, the distance measuring light emitted by the other electro-optical distance meter may be reflected irregularly by the measurement target object and may be received by the host device. When the distance is measured on the basis of the distance measuring light emitted by the other electro-optical distance meter, the measured distance may be different from the actual distance from the host device to the measurement target object and a measurement error may occur.

The present invention has been made to solve the above problems, and an object thereof is to provide an electro-optical distance meter and an electro-optical distance measurement method capable of determining whether light reflected by a measurement target object is a reflection light corresponding to a distance measuring light emitted by a host device to prevent a measurement error when receiving the reflection light reflected by the measurement target object to measure the distance to the measurement target object.

According to the present invention, the above problems are solved by an electro-optical distance meter including: a light emitting element that emits a distance measuring light; a signal generator that generates a first modulation signal modulated at a first frequency and a second modulation signal modulated at a second frequency adjacent to the first frequency; a driving unit that drives the light emitting element on the basis of a first pulsed modulation signal obtained by pulsing the first modulation signal and a second pulsed modulation signal obtained by pulsing the second modulation signal and switchably outputs a first distance measuring light modulated at the first frequency and a second distance measuring light modulated at the second frequency; a photodetection element that receives a first reflected distance measuring light corresponding to the first distance measuring light reflected by a measurement target object and a second reflected distance measuring light corresponding to the second distance measuring light reflected by the measurement target object; a frequency conversion unit that frequency-converts the first reflected distance measuring light received by the photodetection element to generate a first difference frequency signal and frequency-converts the second reflected distance measuring light received by the photodetection element to generate a second difference frequency signal having a phase difference corresponding to a distance to the measurement target object with respect to the first difference frequency signal; an arithmetic unit that executes an arithmetic process of calculating a distance value to the measurement target object on the basis of the phase difference between the first difference frequency signal and the second difference frequency signal; and a determining unit that determines whether identification information indicating a host device is included in a photodetection signal including the first distance measuring light and the second distance measuring light received by the photodetection element, wherein the driving unit drives the light emitting element so that the identification information is included in the light emission signal emitted by the light emitting element, and the arithmetic unit executes the arithmetic process of calculating the distance value when the determining unit determines that the identification information is included in the photodetection signal.

According to the electro-optical distance meter having this configuration, the first distance measuring light modulated at the first frequency and the second distance measuring light modulated at the second frequency are switchably output from the light emitting element, and the first reflected distance measuring light corresponding to the first distance measuring light reflected by the measurement target object and the second reflected distance measuring light corresponding to the second distance measuring light reflected by the measurement target object are received by the photodetection element. Since the first difference frequency signal obtained by frequency-converting the first reflected distance measuring light and the second difference frequency signal obtained by frequency-converting the second reflected distance measuring light have a phase difference corresponding to the distance to the measurement target object, it is possible to calculate the distance value to the measurement target object on the basis of the first difference frequency signal and the second difference frequency signal.

According to the electro-optical distance meter having this configuration, the driving unit drives the light emitting element so that the identification information indicating the host device is included in the light emission signal emitted by the light emitting element, and the determining unit determines whether the identification information is included in the photodetection signal including the first distance measuring light and the second distance measuring light received by the photodetection element. In the electro-optical distance meter of this configuration, the arithmetic unit executes an arithmetic process of calculating the distance value when the determining unit determines that the identification information is included. Since the distance value is calculated when the identification information indicating the host device is included in the photodetection signal, even when a distance measuring light emitted by another adjacent electro-optical distance meter is received, the distance value is not calculated from the distance measuring light. Therefore, when another electro-optical distance meter is disposed at an adjacent position, it is possible to prevent a measurement error resulting from measuring the distance from the distance measuring light emitted by the other electro-optical distance meter.

As described above, according to the electro-optical distance meter of this configuration, it is possible to appropriately determine whether light reflected by the measurement target object is a reflection light corresponding to a distance measuring light emitted by a host device to prevent a measurement error when the reflection light reflected by the measurement target object is received to measure the distance to the measurement target object.

In the electro-optical distance meter of the present invention, preferably, the driving unit outputs the first distance measuring light and the second distance measuring light alternately at predetermined time intervals and outputs an emission pattern including the identification information made up of a combination of a plurality of pulse widths of the first distance measuring light and a plurality of pulse widths of the second distance measuring light.

According to the electro-optical distance meter of this configuration, it is possible to output an emission pattern including the identification information made up of a combination of a plurality of pulse widths of the first distance measuring light and a plurality of pulse widths of the second distance measuring light without changing the predetermined time interval at which the first distance measuring light and the second distance measuring light are output alternately. With this configuration, it is possible to prevent a measurement error when another electro-optical distance meter is disposed at an adjacent position without deteriorating the distance measuring performance.

In the electro-optical distance meter of the present invention, preferably, the driving unit outputs an emission pattern including the identification information made up of a combination of emission intervals of the first distance measuring light and the second distance measuring light.

According to the electro-optical distance meter of this configuration, it is possible to output an emission pattern including the identification information made up of a combination of the emission intervals of the first distance measuring light and the second distance measuring light without changing the pulse widths of the first distance measuring light and the second distance measuring light. With this configuration, it is possible to prevent a measurement error when another electro-optical distance meter is disposed at an adjacent position while maintaining the pulse widths of the first distance measuring light and the second distance measuring light.

In the electro-optical distance meter of the present invention, preferably, the driving unit outputs the first distance measuring light and the second distance measuring light alternately at predetermined time intervals and outputs a light emission signal including the identification information in a period from the end of the output of the first distance measuring light to the start of the output of the second distance measuring light.

According to the electro-optical distance meter of this configuration, it is possible to output the light emission signal including the identification information using the period from the end of the output of the first distance measuring light to the start of the output of the second distance measuring light without changing the predetermined time intervals at which the first distance measuring light and the second distance measuring light are output alternately. With this configuration, it is possible to prevent a measurement error when another electro-optical distance meter is disposed at an adjacent position without deteriorating the distance measuring performance.

According to the present invention, the above problems are solved by an electro-optical distance measurement method including: a signal generating step of generating a first modulation signal modulated at a first frequency and a second modulation signal modulated at a second frequency adjacent to the first frequency; a light emitting step of driving a light emitting element on the basis of a first pulsed modulation signal obtained by pulsing the first modulation signal and a second pulsed modulation signal obtained by pulsing the second modulation signal and switchably outputting a first distance measuring light modulated at the first frequency and a second distance measuring light modulated at the second frequency; a photodetection step of allowing a photodetection element to receive a first reflected distance measuring light corresponding to the first distance measuring light reflected by a measurement target object and a second reflected distance measuring light corresponding to the second distance measuring light reflected by the measurement target object; a frequency conversion step of frequency-converting the first reflected distance measuring light received in the photodetection step to generate a first difference frequency signal and frequency-converting the second reflected distance measuring light received in the photodetection step to generate a second difference frequency signal having a phase difference corresponding to a distance to the measurement target object with respect to the first difference frequency signal; an arithmetic step of executing an arithmetic process of calculating a distance value to the measurement target object on the basis of the phase difference between the first difference frequency signal and the second difference frequency signal; and a determining step of determining whether identification information indicating a host device is included in a photodetection signal including the first distance measuring light and the second distance measuring light received by the photodetection element, wherein the light emitting step involves driving the light emitting element so that the identification information is included in the light emission signal emitted by the light emitting element, and the arithmetic step involves executing the arithmetic process of calculating the distance value when it is determined in the determining step that the identification information is included in the photodetection signal.

According to the electro-optical distance measurement method of this configuration, it is possible to appropriately determine whether reflection light reflected by the measurement target object is a reflection light corresponding to a distance measuring light emitted by a host device to prevent a measurement error when the reflection light reflected by the measurement target object is received and the distance to the measurement target object is measured.

According to the present invention, it is possible to provide an electro-optical distance meter and an electro-optical distance measurement method capable of determining whether reflection light reflected by a measurement target object is a reflection light corresponding to a distance measuring light emitted by a host device to prevent a measurement error when receiving the reflection light reflected by the measurement target object and the distance to the measurement target object is measured.

DETAILED DESCRIPTION

First Embodiment

Hereinafter, an electro-optical distance meter according to a first embodiment will be described with reference to the drawings.

Figure 1:
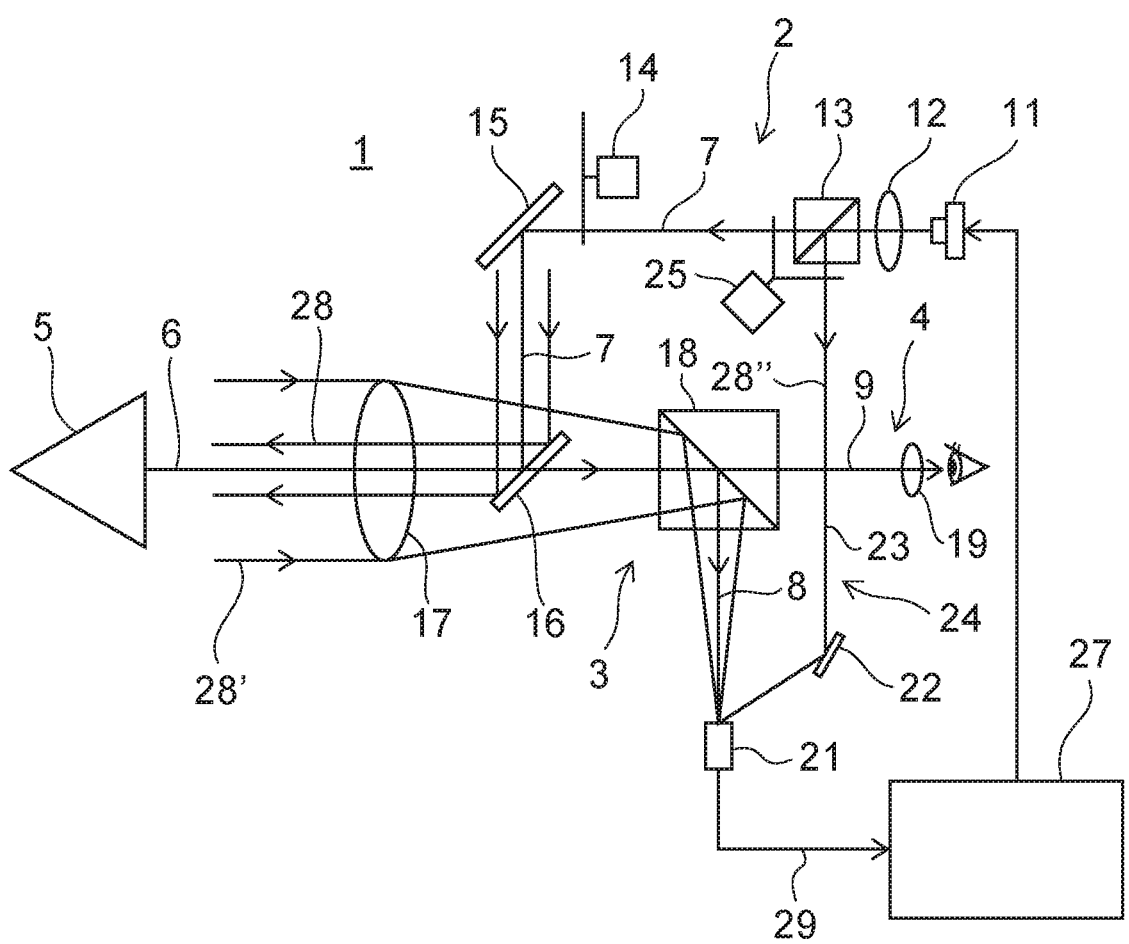
FIG. 1 is a schematic diagram illustrating a distance measuring optical system of an electro-optical distance meter according to an embodiment of the present invention.

First, a distance measuring optical system 1 of the electro-optical distance meter according to the present embodiment will be described. FIG. 1 is a schematic diagram illustrating the distance measuring optical system 1 of the electro-optical distance meter according to the present embodiment. As illustrated in FIG. 1, the distance measuring optical system 1 includes a emission optical system 2, a photodetection optical system 3, and a collimation optical system 4. In FIG. 1, a measurement target object 5 is a prism which is a recursive reflector.

The distance measuring optical system 1 has a distance measuring optical axis 6 directed to the measurement target object 5, the emission optical system 2 has a emission optical axis 7, the photodetection optical system 3 has a photodetection optical axis 8, and the collimation optical system 4 has a collimation optical axis 9.

A light emitting element 11, a condenser lens 12, a half mirror 13, a light quantity adjustor 14, and deflection mirrors 15 and 16 are provided on the emission optical axis 7. A distance measuring light that passes through the emission optical axis 7 is deflected by the deflection mirrors 15 and 16 so as to coincide with the distance measuring optical axis 6. The light emitting element 11 is a laser diode, for example, and emits an invisible distance measuring light.

An objective lens 17 and a dichroic mirror 18 are provided on the distance measuring optical axis 6. The dichroic mirror 18 is configured to allow a visible light to pass therethrough and reflect a distance measuring light therefrom. A part in which the distance measuring optical axis 6 passes through the dichroic mirror 18 is the collimation optical axis 9, and an eyepiece lens 19 is provided on the collimation optical axis 9.

The objective lens 17, the dichroic mirror 18, the eyepiece lens 19, and the like form the collimation optical system 4.

The condenser lens 12, the half mirror 13, the light quantity adjustor 14, the deflection mirrors 15 and 16, the objective lens 17, and the like form the emission optical system 2.

A part in which the distance measuring optical axis 6 is reflected by the dichroic mirror 18 is the photodetection optical axis 8, and a photodetection element 21 is provided on the photodetection optical axis 8. The objective lens 17, the dichroic mirror 18, and the like form the photodetection optical system 3.

A reflection optical axis of the half mirror 13 is guided to the photodetection element 21 via a reflection mirror 22 as an internal reference optical axis 23. The half mirror 13 and the reflection mirror 22 form an internal reference optical system 24. The light emitting element 11 and the photodetection element 21 are electrically connected to an arithmetic processing unit 27.

An optical path switching unit 25 is provided in the emission optical axis 7 and the internal reference optical axis 23. The optical path switching unit 25 is configured to selectively block or open the emission optical axis 7 and the internal reference optical axis 23. The optical path switching unit 25 interchangeably switches modes between a first mode in which a distance measuring light having passed through the half mirror 13 will be emitted toward the measurement target object 5 and a second mode in which a portion of the distance measuring light reflected by the half mirror 13 will be emitted toward the internal reference optical system 24.

Next, an operation of the distance measuring optical system 1 will be described. A distance measuring light 28 emitted from the light emitting element 11 and converted to a collimated light flux by the condenser lens 12 is subjected to light quantity adjustment through the light quantity adjustor 14, passes through a central part of the objective lens 17, and is emitted to the measurement target object 5.

The distance measuring light reflected by the measurement target object 5 enters the objective lens 17 as a reflected distance measuring light 28' and is then condensed by the objective lens 17 and reflected by the dichroic mirror 18, and enters the photodetection element 21. The photodetection element 21 generates an intermittent photodetection signal 29 corresponding to the received reflected distance measuring light 28'.

A portion (an internal reference light 28") of the distance measuring light 28 emitted by the light emitting element 11 is reflected by the half mirror 13. When the internal reference optical axis 23 is opened by the optical path switching of the optical path switching unit 25, the internal reference light 28" enters the photodetection element 21. The photodetection element 21 generates a photodetection signal corresponding to the received internal reference light 28".

A visible light that has entered the objective lens 17 passes through the dichroic mirror 18 and is condensed by the eyepiece lens 19. A surveying operator can collimate the measurement target object 5 with the aid of the visible light entering the eyepiece lens 19.

Figure 2:
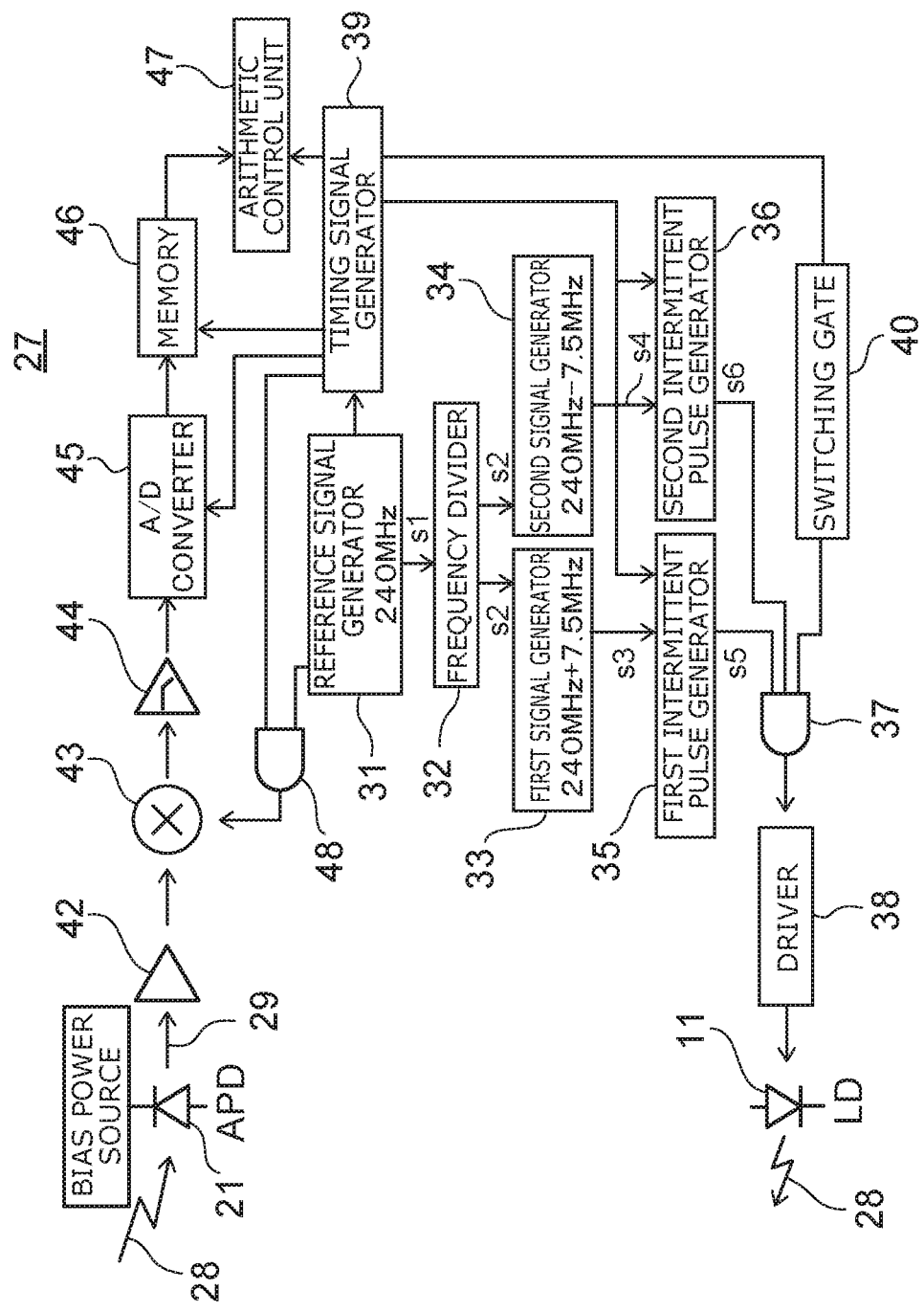
FIG. 2 is a schematic diagram illustrating an arithmetic processing unit of the electro-optical distance meter according to an embodiment of the present invention.

Next, the arithmetic processing unit 27 of the electro-optical distance meter according to the present embodiment will be described. FIG. 2 is a schematic diagram illustrating the arithmetic processing unit 27 of the electro-optical distance meter according to the present embodiment. A reference signal generator 31 generates a reference frequency signal s1 of a predetermined reference frequency fc. The numerical values mentioned below can be changed appropriately depending on a measurement distance and a measurement accuracy. For example, in the following description, 240 MHz is set as the reference frequency fc.

The reference frequency fc of the reference frequency signal s1 generated from the reference signal generator 31 is divided to 1/n by a frequency divider 32, and a frequency division signal s2 of a frequency f is generated. The frequency division signal s2 is input to a first signal generator 33 and a second signal generator 34. The frequency f is fc/n, and when the frequency divider 32 is a frequency divider that divides the reference frequency fc of 240 MHz to 1/32, the frequency f is 7.5 MHz.

The first signal generator 33 generates a first modulation signal s3 modulated at fc+f [Hz] by the frequency division signal s2 and the reference frequency signal s1 and outputs the first modulation signal s3 to a first intermittent pulse generator 35. The second signal generator 34 generates a second modulation signal s4 modulated at fc−f [Hz] by the frequency division signal s2 and the reference frequency signal s1 and outputs the second modulation signal s4 to a second intermittent pulse generator 36. Two modulation signals having adjacent frequencies, fc+f [Hz] and fc−f [Hz] are generated by the first signal generator 33 and the second signal generator 34.

The first intermittent pulse generator 35 pulses the first modulation signal s3 which is a continuous signal and converts the first modulation signal s3 to a first pulsed modulation signal s5 which is an intermittent signal emitted every predetermined time intervals. The first pulsed modulation signal s5 is input from the first intermittent pulse generator 35 to an AND circuit 37. Therefore, the pulses of the first pulsed modulation signal s5 includes the frequency of fc+f (240 MHz+7.5 MHz).

The second intermittent pulse generator 36 pulses the second modulation signal s4 which is a continuous signal and converts the second modulation signal s4 to a second pulsed modulation signal s6 which is an intermittent signal emitted every predetermined time intervals. The second pulsed modulation signal s6 is input from the second intermittent pulse generator 36 to the AND circuit 37. Therefore, the pulses of the second pulsed modulation signal s6 includes the frequency of fc−f (240 MHz-7.5 MHz).

A timing signal generator 39 uses the reference frequency signal s1 generated by the reference signal generator 31 as a reference and generates the first pulsed modulation signal s5 and a timing signal for switching states between an emission state and a non-emission state of the first pulsed modulation signal s5. The timing signal generator 39 generates the timing signal and sends the timing signal to the first intermittent pulse generator 35 and the second intermittent pulse generator 36 and controls the first intermittent pulse generator 35 and the second intermittent pulse generator 36 so that the first pulsed modulation signal s5 from the first intermittent pulse generator 35 and the second pulsed modulation signal s6 from the second intermittent pulse generator 36 are output alternately and at a time interval (a burst period) tb.

The timing signal from the timing signal generator 39 is input to a switching gate 40. A switching signal is input from the switching gate 40 to the AND circuit 37. The AND circuit 37 outputs the first pulsed modulation signal s5 and the second pulsed modulation signal s6 alternately to a driver 38 according to a switching signal from the switching gate 40.

The driver 38 drives the light emitting element 11 on the basis of the first pulsed modulation signal s5 and the second pulsed modulation signal s6 and switchably outputs a distance measuring light (a first distance measuring light) modulated at fc+f (240 MHz+7.5 MHz) and a distance measuring light (a second distance measuring light) modulated at fc−f (240 MHz-7.5 MHz).

Figure 4:
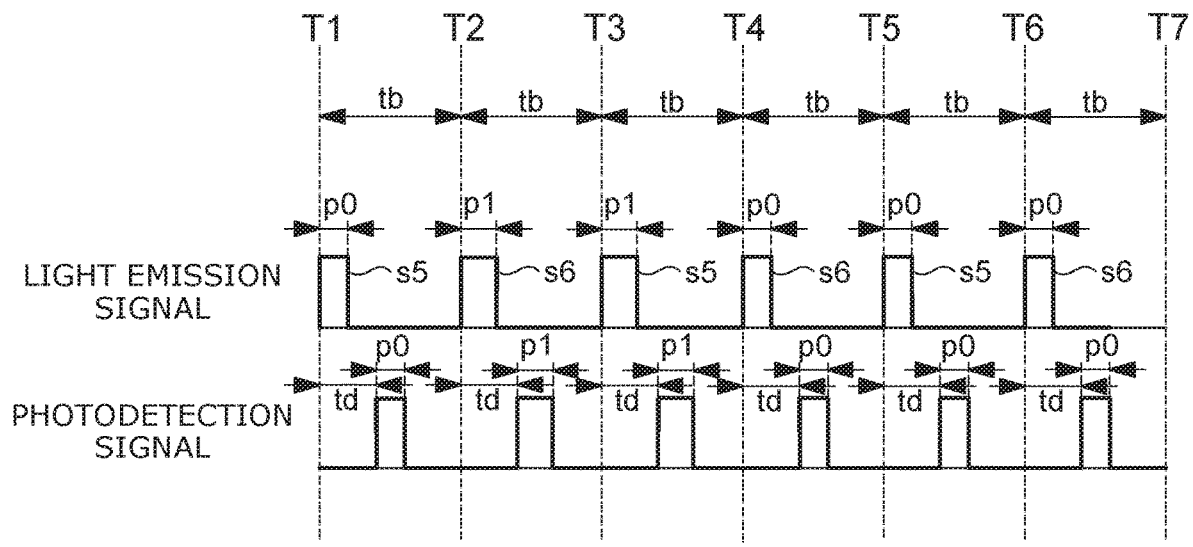
FIG. 4 is a timing chart illustrating a light emission signal emitted by a light emitting element and a photodetection signal received by a photodetection element, where the light emitting element and the photodetection element are both illustrated in FIG. 2.

FIG. 4 is a timing chart illustrating a light emission signal emitted by the light emitting element 11 and a photodetection signal received by the photodetection element 21, where the light emitting element and the photodetection element are both illustrated in FIG. 2. The timing chart illustrated in the upper part of FIG. 4 is a timing chart illustrating an emission timing of the light emission signal in which a high-level signal period is an emission period and a low-level signal period is a non-emission period. As illustrated in FIG. 4, the light emitting element 11 alternately outputs a distance measuring light based on the first pulsed modulation signal s5 and a distance measuring light based on the second pulsed modulation signal s6 while switching them at time intervals tb.

When the distance measuring light 28 is emitted intermittently (that is, emitted in a pulsed manner), an emission load factor of the light emitting element 11 decreases. Since a peak value increases as the emission load factor decreases, it is possible to increase the light intensity of the distance measuring light and to measure a long distance without impairing the eye safety. Here, the predetermined time width and the predetermined time interval are selected appropriately depending on a measurement condition.

The photodetection element 21 receives the distance measuring light 28 which has been emitted from the light emitting element 11 toward the measurement target object 5 and been reflected by the measurement target object 5 and has passed through the photodetection optical system 3. The photodetection element 21 generates the intermittent photodetection signal 29 corresponding to the received distance measuring light 28. A photodiode or an avalanche photodiode (APD), for example, are used as the photodetection element 21.

A portion of the distance measuring light 28 reflected by the measurement target object 5 is received by the photodetection element 21 via the internal reference optical system 24 as the internal reference light 28" when the optical path is switched by the optical path switching unit 25. Since processing of the photodetection signal when the reflected distance measuring light 28' is received is similar to processing of the photodetection signal when the internal reference light 28" is received, the processing of the photodetection signal of the reflected distance measuring light 28' will be described below.

As illustrated in FIG. 4, the photodetection element 21 alternately receives a pulse modulation light (a first reflected distance measuring light) based on the first pulsed modulation signal s5 of fc+f (240 MHz+7.5 MHz) and a pulse modulation light (a second reflected distance measuring light) based on the second pulsed modulation signal s6 of fc−f (240 MHz-7.5 MHz) as the reflected distance measuring light 28'. Therefore, the photodetection signal of the photodetection element 21 is a pulse output, and the inside of the pulse is the intermittent photodetection signal 29 having the frequencies of fc+f [Hz] and fc−f [Hz]. As illustrated in FIG. 4, a delay time td corresponding to a linear distance between the electro-optical distance meter and the measurement target object 5 occurs between the photodetection signal and the light emission signal.

The photodetection signal is amplified by an amplifier 42 and the amplified signal is input to a mixing circuit 43. The reference frequency signal s1 of the reference frequency fc (240 MHz) is input from the reference signal generator 31 to the mixing circuit 43 via the AND circuit 48. The timing at which the reference frequency signal s1 is input is controlled by a timing signal from the timing signal generator 39 so as to be mixed with the photodetection signal (an intermittent signal) of the pulse modulation light of fc+f (240 MHz+7.5 MHz) and the photodetection signal (an intermittent signal) of the pulse modulation light of fc−f (240 MHz-7.5 MHz).

The photodetection signal of the pulse modulation light of 240 MHz+7.5 MHz and the photodetection signal of the pulse modulation light of 240 MHz-7.5 MHz are frequency-converted by being mixed with the reference frequency signal s1, and the frequencies of ±7.5 MHz and the added frequencies of 240 MHz+240 MHz+7.5 MHz and 240 MHz+240 MHz-7.5 MHz are obtained. Furthermore, the photodetection signals pass through a low-pass filter 44 whereby high-frequency components are removed and a difference frequency of ±7.5 MHz remains. The bandwidth of the low-pass filter 44 is set to approximately 10 MHz, which is sufficient for the difference frequency of 7.5 MHz.

The mixing circuit 43 and the low-pass filter 44 frequency-converts the pulse modulation light of 240 MHz+7.5 MHz received by the photodetection element 21 to a difference frequency signal (a first difference frequency signal) of +7.5 MHz and frequency-converts the pulse modulation light of 240 MHz-7.5 MHz received by the photodetection element 21 to generate a difference frequency signal (a second difference frequency signal) of −7.5 MHz. The difference frequency signal of −7.5 MHz is a signal having a phase difference corresponding to the distance to the measurement target object 5 with respect to the difference frequency signal of +7.5 MHz.

Among two difference frequency signals, one difference frequency signal is a difference frequency signal of 7.5 MHz of which the phase leads in time and the other difference frequency signal is a difference frequency signal of 7.5 MHz of which the phase lags in time. A phase offset (a phase difference) corresponding to a distance (time) occurs between both difference frequencies. The reference signal generator 31, the timing signal generator 39, the AND circuit 48, the mixing circuit 43, the low-pass filter 44, and the like form a frequency conversion unit.

An AD converter 45 converts the difference frequency signal, which is an analog signal output from the low-pass filter 44, into a digital signal and stores the digital signal in a memory 46 as a storage means as sampling data.

Figure 3:
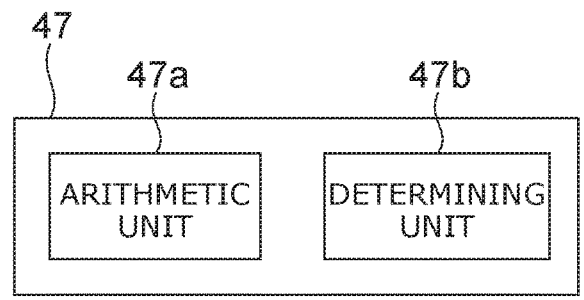
FIG. 3 is a schematic diagram illustrating a configuration of an arithmetic control unit illustrated in FIG. 2.

The arithmetic control unit 47 is configured to execute various arithmetic processes on the basis of the sampling data stored in the memory 46. As illustrated in FIG. 3, the arithmetic control unit 47 includes an arithmetic unit 47a and a determining unit 47b. The arithmetic unit 47a executes an arithmetic process of calculating a distance value d3 from the electro-optical distance meter to the measurement target object 5 on the basis of the sampling data stored in the memory 46. The determining unit 47b determines whether identification information indicating a host device is included in the photodetection signal received by the photodetection element 21 on the basis of the sampling data stored in the memory 46. The identification information indicating the host device will be described later.

The arithmetic unit 47a calculates a difference frequency signal of 7.5 MHz and a difference frequency signal of −7.5 MHz from the sampling data stored in the memory 46 and calculates a coarse measurement distance value d1 (a first distance value) from the phase difference of the two difference frequency signals. The phase difference of the two difference frequency signals is equivalent to that when the same is calculated on the basis of the difference (15 MHz) between the intermittent modulation frequencies. When the respective phases are set as φ1 and φ2, since the wavelength is 10 m when the frequency difference is 15 MHz, the calculated coarse measurement distance value d1 (m) is expressed by Equation (1) below.

$$d1 = 10 \times (\varphi_1 - \varphi_2)/2\pi \tag{1}$$

The arithmetic unit 47a calculates a difference frequency signal of 7.5 MHz and a difference frequency signal of −7.5 MHz from the sampling data stored in the memory 46, calculates the phases from the difference frequency signals, and calculates a precise measurement distance value d2 (a second distance value) corresponding to the difference frequency signals from the phases and the light. The arithmetic control unit 47 executes an arithmetic process of adding the precise measurement distance value d2 to the coarse measurement distance value d1 and calculating a distance value d3 (a third distance value) from the electro-optical distance meter to the measurement target object 5.

When the coarse measurement distance value d1 is calculated, the coarse measurement distance value calculated from the photodetection signal of the internal reference light 28" is subtracted from the coarse measurement distance value calculated from the photodetection signal of the reflected distance measuring light 28'. Similarly, when the precise measurement distance value d2 is calculated, the precise measurement distance value calculated from the photodetection signal of the internal reference light 28" is subtracted from the precise measurement distance value calculated from the photodetection signal of the reflected distance measuring light 28'.

By calculating a difference between the measurement distance value calculated from the reflected distance measuring light 28' and the measurement distance value calculated from the internal reference light 28", it is possible to eliminate the influence of a temperature drift or the like of the arithmetic processing unit 27 which is an electrical circuit. The coarse measurement distance value and the precise measurement distance value calculated from the photodetection signal of the internal reference light 28" may be calculated in advance and be stored in the memory 46.

Next, a method of driving the light emitting element 11 so that the identification information indicating a host device is included in the light emission signal emitted by the light emitting element 11 and determining whether the identification information indicating the host device is included in the photodetection signal received by the photodetection element 21 will be described. In the present embodiment, an arithmetic process of calculating the distance value d3 when the identification information indicating the host device is included in the photodetection signal is executed whereby a measurement error resulting from receiving a distance measuring light emitted by another electro-optical distance meter and measuring a distance is prevented.

As illustrated in FIG. 4, the timing signal generator 39 of the present embodiment sets a pulse width of the first pulsed modulation signal s5 of which the emission state starts at time point T1 to p0 and sets a pulse width of the first pulsed modulation signal of which the emission state starts at time point T3 to p1 that is wider than p0. Moreover, the timing signal generator 39 of the present embodiment sets a pulse width of the second pulsed modulation signal s6 of which the emission state starts at time point T4 to p0 and sets a pulse width of the second pulsed modulation signal of which the emission state starts at time point T2 to p1 that is wider than p0.

As illustrated in FIG. 4, the reason why the pulse widths of the first pulsed modulation signal s5 and the second pulsed modulation signal s6 are set to either p0 or p1 is to use the pulse widths of the first pulsed modulation signal s5 and the second pulsed modulation signal s6 as the identification information indicating the host device. In the present embodiment, the pulse widths of the successive four signals that start from time point T1 and are generated at time intervals of tb are used as the identification information indicating the host device. Specifically, "0" is assigned to the pulse width p0, "1" is assigned to the pulse width p1, and identification information of the four digits made up of "0" and "1" is generated from the pulse widths of the four signals. An identification signal included in the light emission signal illustrated in FIG. 4 is "0110".

When the first pulsed modulation signal s5 is modulated at 240 MHz+7.5 MHz and the second pulsed modulation signal s6 is modulated at 240 MHz-7.5 MHz, the time interval tb is 10 μs, the pulse width p0 is 933 ns, and the pulse width p1 is 1 μs, for example.

The timing signal generated by the timing signal generator 39 is input to the AND circuit 37 via the switching gate 40 and is used for determining a timing for switching the states between the emission state and the non-emission state of the first pulsed modulation signal s5 and the second pulsed modulation signal s6. Since the identification information indicating the host device is included in the timing signal generated by the timing signal generator 39, the driver 38 drives the light emitting element 11 so that the identification information indicating the host device is included in the light emission signal input from the AND circuit 37.

Figure 5:
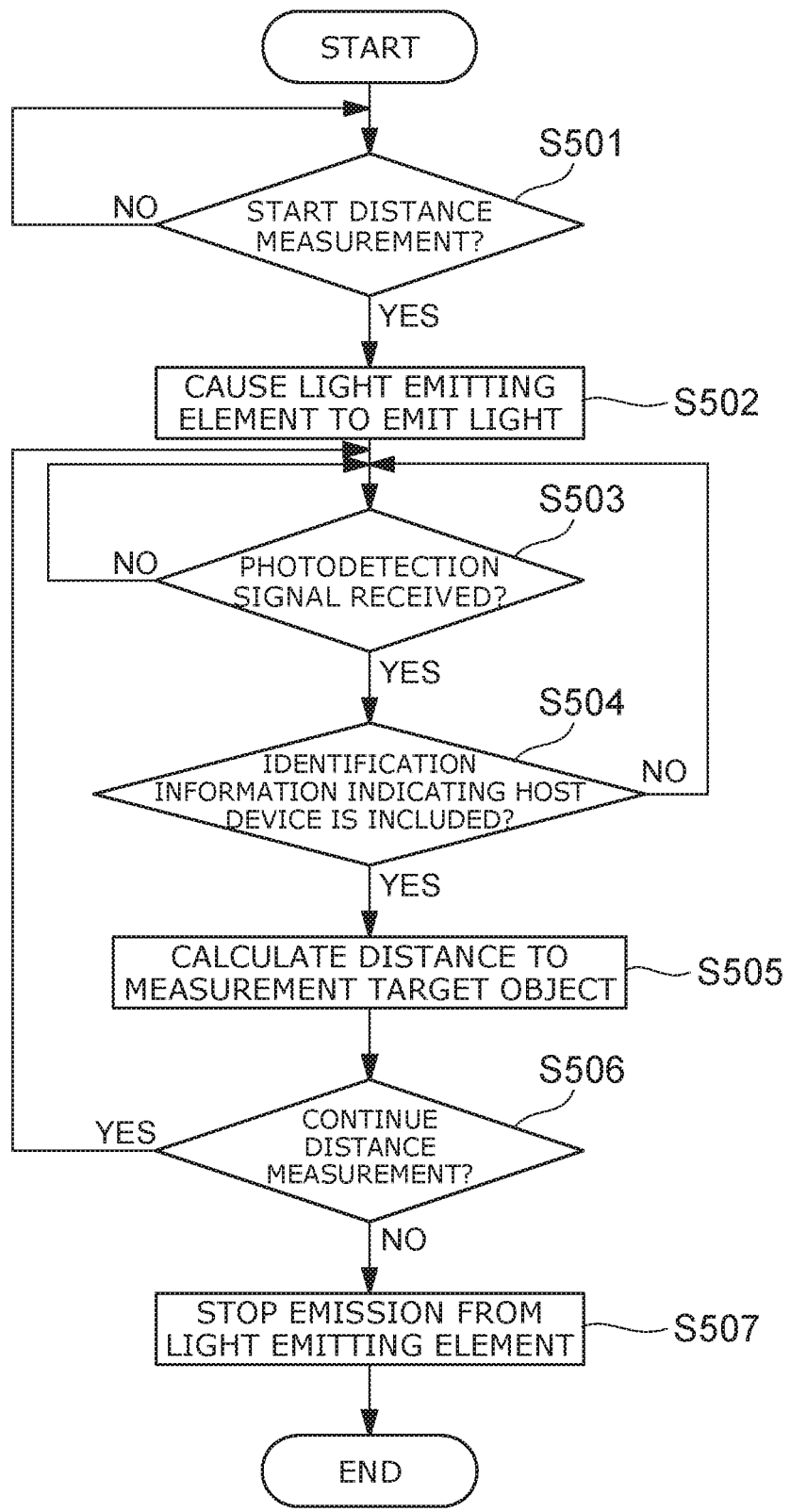
FIG. 5 is a flowchart illustrating a process executed by an arithmetic processing unit of the electro-optical distance meter.

Next, a process executed by the arithmetic processing unit 27 of the electro-optical distance meter having received the photodetection signal in which the identification information indicating the host device is included will be described. FIG. 5 is a flowchart illustrating a process executed by the arithmetic processing unit 27 of the electro-optical distance meter.

In step S501, the arithmetic processing unit 27 determines whether or not to start the distance measurement of the electro-optical distance meter and the flow proceeds to step S502 when a determination result of YES is obtained.

In step S502, the arithmetic processing unit 27 drives the driver 38 with the aid of the first pulsed modulation signal s5 and the second pulsed modulation signal s6 to cause the light emitting element 11 to emit light.

In step S503, the arithmetic processing unit 27 determines whether the photodetection element 21 has received the photodetection signal which is the distance measuring light 28 and the flow proceeds to step S504 when a determination result of YES is obtained.

In step S504, the determining unit 47b of the arithmetic processing unit 27 determines whether the identification information indicating the host device is included in the photodetection signal and the flow proceeds to step S505 when a determination result of YES is obtained.

In the present embodiment, the pulse widths of the successive four signals that start from time point T1 at which distance measurement starts and are generated at time intervals of tb are used as the identification information indicating the host device. Specifically, "0" is assigned to the pulse width p0, "1" is assigned to the pulse width p1, and identification information of the four digits made up of "0" and "1" is generated from the pulse widths of the four signals. An identification signal included in the light emission signal illustrated in FIG. 4 is "0110".

The determining unit 47b determines whether the pulse widths of the photodetection signals corresponding to four pulses stored in the memory 46 are p0 or p1 and generates identification information made up of "0" and "1". When the generated identification information is "0110", the determining unit 47b determines that the identification information indicating the host device is included in the photodetection signal.

Figure 6:
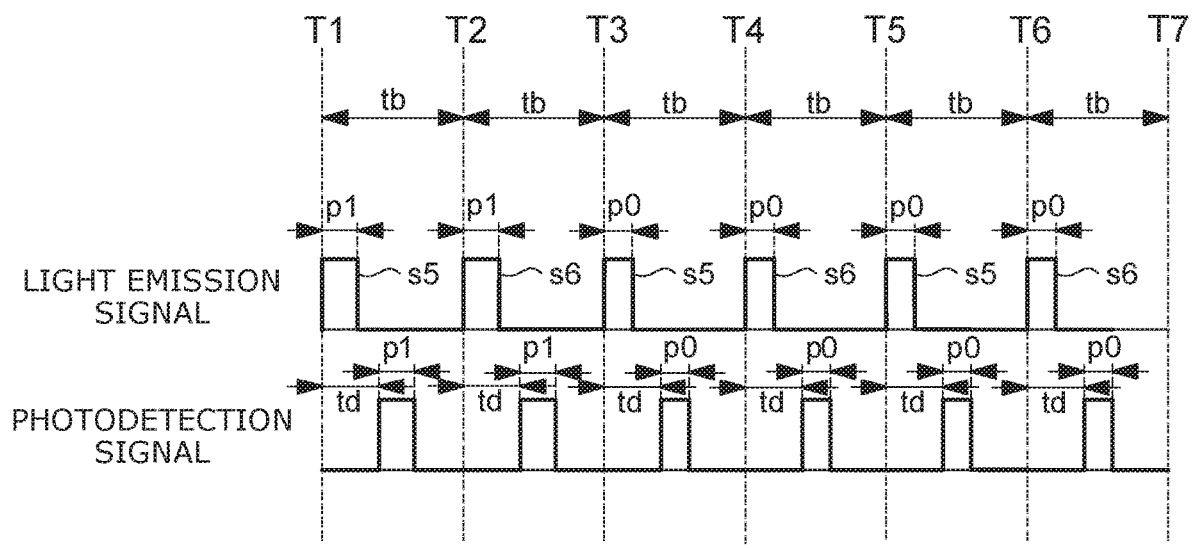
FIG. 6 is a timing chart illustrating a light emission signal emitted by a light emitting element and a photodetection signal received by a photodetection element of a host device, where the light emitting element and the photodetection element are both elements of another electro-optical distance meter.

When the identification information generated from the photodetection signal is not "0110", the determining unit 47b determines that the identification information indicating the host device is not included in the photodetection signal. FIG. 6 is a timing chart illustrating the light emission signal emitted by the light emitting element and the photodetection signal received by the photodetection element of the host device, where the light emitting element and the photodetection element are both elements of another electro-optical distance meter. When the photodetection element 21 of the host device has received the photodetection signal illustrated in FIG. 6, the determining unit 47b determines whether the pulse width of the photodetection signals corresponding to four pulses stored in the memory 46 are p0 or p1 and generates identification information made up of "0" and "1". The determining unit 47b determines that the identification information indicating the host device is not included in the photodetection signal since the generated identification information is "1100".

When the determining unit 47b determines that the identification information indicating the host device is not included in the photodetection signal, the timing signal generator 39 may adjust a timing at which the host device emits a light emission signal so that the timing at which the photodetection element 21 receives the light emission signal emitted by the host device does not overlap a timing at which the photodetection element 21 receives the light emission signal emitted by another electro-optical distance meter.

For example, the timing signal generator 39 generates a timing signal so that the first pulsed modulation signal s5 is emitted at a timing at which the photodetection element 21 receives the light emission signal emitted by another electro-optical distance meter. By doing so, it is possible to obviate a problem that the photodetection element 21 receives the light emission signal of another electro-optical distance meter and the light emission signal of the host device simultaneously.

In step S505, since the identification information indicating the host device is included in the photodetection signal, the arithmetic unit 47a of the arithmetic processing unit 27 executes an arithmetic process of calculating the distance value d3 from the electro-optical distance meter to the measurement target object 5 on the basis of the sampling data stored in the memory 46. The arithmetic unit 47a stores the distance value d3 calculated in the arithmetic process in the memory 46.

In step S506, the arithmetic processing unit 27 determines whether distance measurement will be continued and step S503 is executed again when a determination result of YES is obtained whereas the flow proceeds to step S507 when a determination result of NO is obtained.

In step S507, the arithmetic processing unit 27 controls the driver 38 to stop light emission of the light emitting element 11.

The operation and the effects of the electro-optical distance meter according to the present embodiment described above will be described.

According to the electro-optical distance meter of the present embodiment, a first distance measuring light modulated at fc+f and a second distance measuring light modulated at fc−f are switchably output from the light emitting element 11, and a first reflected distance measuring light corresponding to the first distance measuring light reflected by the measurement target object 5 and a second reflected distance measuring light corresponding to the second distance measuring light reflected by the measurement target object 5 are received by the photodetection element 21.

Since a first difference frequency signal obtained by frequency-converting the first reflected distance measuring light and a second difference frequency signal obtained by frequency-converting the second reflected distance measuring light have a phase difference corresponding to the distance to the measurement target object 5, the coarse measurement distance value d1 is calculated on the basis of the phase difference. By adding the precise measurement distance value d2 based on the phase of the first difference frequency signal and the phase of the second difference frequency signal to the coarse measurement distance value d1, it is possible to calculate the distance value d3 to the measurement target object 5.

According to the electro-optical distance meter of the present embodiment, the driver 38 drives the light emitting element 11 so that the identification information indicating the host device is included in the light emission signal emitted by the light emitting element 11, and the determining unit 47b determines whether the identification information is included in the photodetection signal including the first distance measuring light and the second distance measuring light received by the photodetection element 21. The electro-optical distance meter of the present embodiment executes an arithmetic process in which the arithmetic unit 47a calculates the distance value d3 when the determining unit 47b determines that the identification information is included. Since the distance value d3 is calculated when the identification information indicating the host device is included in the photodetection signal, even when a distance measuring light emitted by another adjacent electro-optical distance meter is received, the distance value d3 is not calculated from the distance measuring light. Therefore, when another electro-optical distance meter is disposed at an adjacent position, it is possible to prevent a measurement error resulting from measuring the distance from the distance measuring light emitted by the other electro-optical distance meter.

According to the electro-optical distance meter of the present embodiment, it is possible to output an emission pattern including the identification information made up of a combination of a pulse width of a plurality of first pulsed modulation signals s5 and a pulse width of a plurality of second pulsed modulation signals s6 without changing the time interval tb at which the first pulsed modulation signal s5 (the first distance measuring light) and the second pulsed modulation signal s6 (the second distance measuring light) are output alternately. With this configuration, it is possible to prevent a measurement error when another electro-optical distance meter is disposed at an adjacent position without deteriorating the distance measuring performance.

Second Embodiment

Next, an electro-optical distance meter according to a second embodiment of the present invention will be described.

The present embodiment is a modification of the first embodiment and is similar to the first embodiment unless particularly stated otherwise, and the redundant description thereof will be omitted.

The electro-optical distance meter of the first embodiment sets the pulse widths of the first pulsed modulation signal s5 and the second pulsed modulation signal s6 to either the pulse width p0 or the pulse width p1 and uses a combination of the two pulse widths as the identification information indicating the host device.

In contrast, the electro-optical distance meter of the present embodiment sets the pulse widths of the first pulsed modulation signal s5 and the second pulsed modulation signal s6 to a plurality of pulse widths of three or more pulse widths.

Figure 7:
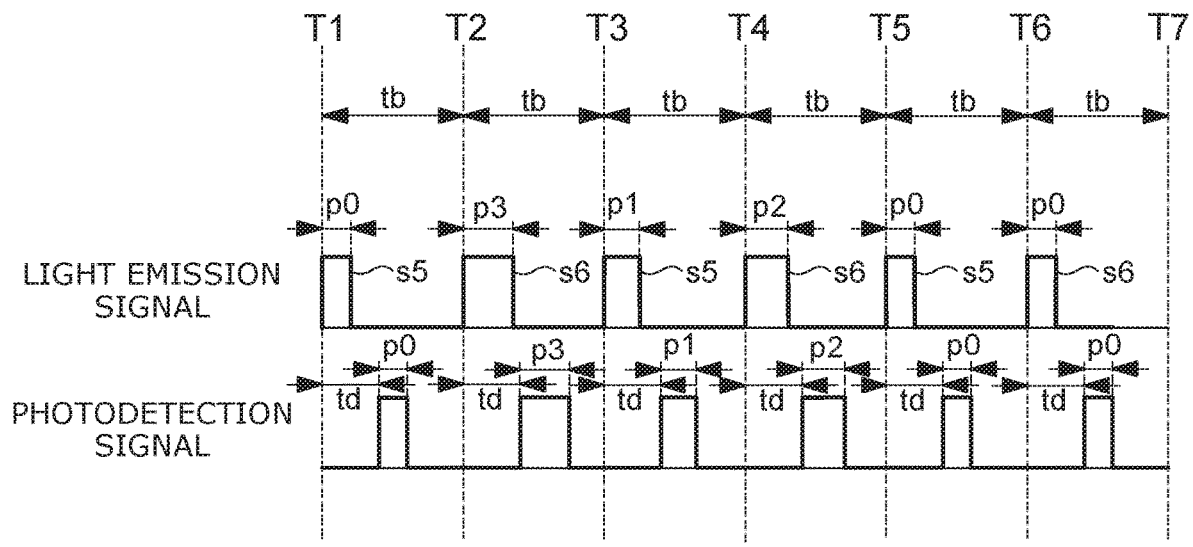
FIG. 7 is a timing chart illustrating a light emission signal emitted by a light emitting element and a photodetection signal received by a photodetection element, where the light emitting element and the photodetection element are both elements of an electro-optical distance meter of a second embodiment.

FIG. 7 is a timing chart illustrating a light emission signal emitted by the light emitting element 11 and a photodetection signal received by the photodetection element 21 where the light emitting element and the photodetection element are both elements of an electro-optical distance meter of a second embodiment. As illustrated in FIG. 7, the timing signal generator 39 of the present embodiment sets a pulse width of the first pulsed modulation signal s5 of which the emission state starts at time point T1 to p0 and sets a pulse width of the first pulsed modulation signal of which the emission state starts at time point T3 to p1. Moreover, the timing signal generator 39 of the present embodiment sets a pulse width of the second pulsed modulation signal s6 of which the emission state starts at time point T2 to p3 and sets a pulse width of the second pulsed modulation signal of which the emission state starts at time point T4 to p2.

When the first pulsed modulation signal s5 is modulated at 240 MHz+7.5 MHz and the second pulsed modulation signal s6 is modulated at 240 MHz-7.5 MHz, the time interval tb is 10 μs, the pulse width p0 is 933 ns, the pulse width p1 is 1 μs, the pulse width p2 is 1.2 μs, and the pulse width p3 is 1.3 μs, for example. Although four pulse widths of p0, p1, p2, and p3 are used, an arbitrary number of pulse widths of three or more types may be set.

As illustrated in FIG. 7, the reason why the pulse widths of the first pulsed modulation signal s5 and the second pulsed modulation signal s6 are set to either one of the three or more types is to use the pulse widths of the first pulsed modulation signal s5 and the second pulsed modulation signal s6 as the identification information indicating the host device. In the present embodiment, the pulse widths of the successive four signals that start from time point T1 and are generated at time intervals of tb are used as the identification information indicating the host device. Specifically, "0" is assigned to the pulse width p0, "1" is assigned to the pulse width p1, "2" is assigned to the pulse width p2, "3" is assigned to the pulse width p3, and identification information of four digits is generated from the pulse widths of the four signals. An identification signal included in the light emission signal illustrated in FIG. 7 is "0312".

In the present embodiment, although the pulse widths of the successive four signals that start from time point T1 and are generated at time intervals of tb are used as the identification information indicating the host device, there is no limitation thereto. For example, a combination of pulse widths of an arbitrary number of signals such as five or six successive signals may be used as the identification information indicating the host device.

Next, a process executed by the determining unit 47b when the photodetection element 21 receives the photodetection signal illustrated in FIG. 7 will be described.

In step S504 of FIG. 5, the determining unit 47b of the arithmetic processing unit 27 determines whether the identification information indicating the host device is included in the photodetection signal.

The determining unit 47b determines whether the pulse widths of the photodetection signals that are equivalent to four pulses and are stored in the memory 46 are either one of p1 to p3 and generates the identification information made up of "0" to "3". The determining unit 47b determines that the identification information indicating the host device is included in the photodetection signal when the generated identification information is "0312".

Third Embodiment

Next, an electro-optical distance meter according to a third embodiment of the present invention will be described.

The present embodiment is a modification of the first embodiment and is similar to the first embodiment unless particularly stated otherwise, and the redundant description thereof will be omitted.

The electro-optical distance meter of the present embodiment uses identification information made up of a combination of the emission intervals of the first pulsed modulation signal s5 and the second pulsed modulation signal s6.

Figure 8:
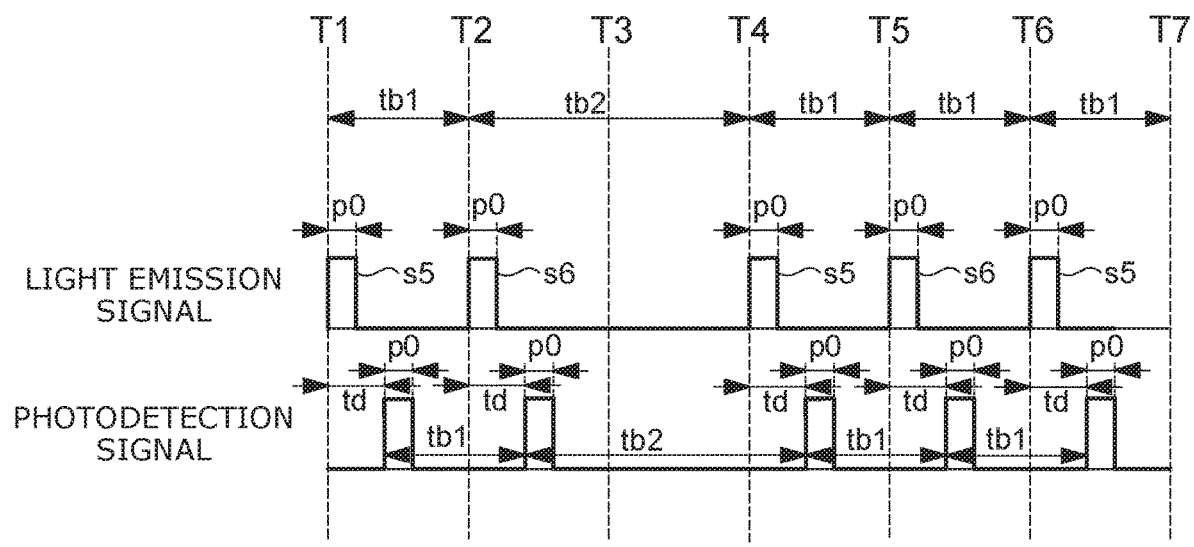
FIG. 8 is a timing chart illustrating a light emission signal emitted by a light emitting element and a photodetection signal received by a photodetection element, where the light emitting element and the photodetection element are both elements of an electro-optical distance meter of a third embodiment.

FIG. 8 is a timing chart illustrating a light emission signal emitted by the light emitting element 11 and a photodetection signal received by the photodetection element 21, where the light emitting element and the photodetection element are both elements of an electro-optical distance meter of a third embodiment. As illustrated in FIG. 8, the timing signal generator 39 of the present embodiment sets a time interval (an emission interval) from the first pulsed modulation signal s5 emitted at time point T1 to the second pulsed modulation signal s6 emitted subsequently to tb1 and sets a time interval from the second pulsed modulation signal s6 emitted at time point T2 to the first pulsed modulation signal s5 emitted subsequently to tb2 that is longer than tb1. Moreover, the timing signal generator 39 sets a time interval (an emission interval) from the first pulsed modulation signal s5 emitted at time point T4 to the second pulsed modulation signal s6 emitted subsequently to tb1 and sets a time interval from the second pulsed modulation signal s6 emitted at time point T5 to the first pulsed modulation signal s5 emitted subsequently to tb1.

When the first pulsed modulation signal s5 is modulated at 240 MHz+7.5 MHz and the second pulsed modulation signal s6 is modulated at 240 MHz-7.5 MHz, the time interval tb1 is 10 μs, the time interval tb2 is 20 μs, and the pulse width p0 is 933 ns, for example.

As illustrated in FIG. 8, the reason why the emission intervals of the first pulsed modulation signal s5 and the second pulsed modulation signal s6 are set to either tb1 or tb2 is to use the emission intervals of the first pulsed modulation signal s5 and the second pulsed modulation signal s6 as the identification information indicating the host device. In the present embodiment, the time intervals (emission intervals) of the successive four signals that start from time point T1 are used as the identification information indicating the host device. Specifically, "0" is assigned to the time interval tb1, "1" is assigned to the time interval tb2, and identification information of the four digits made up of the time intervals of the four signals is generated. An identification signal included in the light emission signal illustrated in FIG. 8 is "0100".

In the present embodiment, although the time intervals of the successive four signals that start from time point T1 are used as the identification information indicating the host device, there is no limitation thereto. For example, a combination of time intervals of an arbitrary number of signals such as five or six successive signals may be used as the identification information indicating the host device. Moreover, an arbitrary number of time intervals such as three or more types may be set as well as the two types of tb1 and tb2.

Next, a process executed by the determining unit 47b when the photodetection element 21 receives the photodetection signal illustrated in FIG. 8 will be described.

In step S504 of FIG. 5, the determining unit 47b of the arithmetic processing unit 27 determines whether the identification information indicating the host device is included in the photodetection signal.

The determining unit 47b determines whether the time intervals of the photodetection signals corresponding to the four pulses stored in the memory 46 are either tb1 or tb2 and generates the identification information made up of "0" and "1". The determining unit 47b determines that the identification information indicating the host device is included in the photodetection signal when the generated identification information is "0100".

According to the electro-optical distance meter of the present embodiment, it is possible to output a light emission signal including the identification information made up of a combination of the emission intervals of the first pulsed modulation signal s5 (the first distance measuring light) and the second pulsed modulation signal s6 (the second distance measuring light) without changing the pulse widths thereof. With this configuration, it is possible to prevent a measurement error when another electro-optical distance meter is disposed at an adjacent position while maintaining the pulse widths of the first pulsed modulation signal s5 and the second pulsed modulation signal s6.

Fourth Embodiment

Next, an electro-optical distance meter according to a fourth embodiment of the present invention will be described.

The present embodiment is a modification of the first embodiment and is similar to the first embodiment unless particularly stated otherwise, and the redundant description thereof will be omitted.

The electro-optical distance meter of the present embodiment outputs a light emission signal including the identification information in a period from a time point at which the output of the first pulsed modulation signal s5 ends to a time point at which the output of the second pulsed modulation signal s6 starts.

Figure 9:
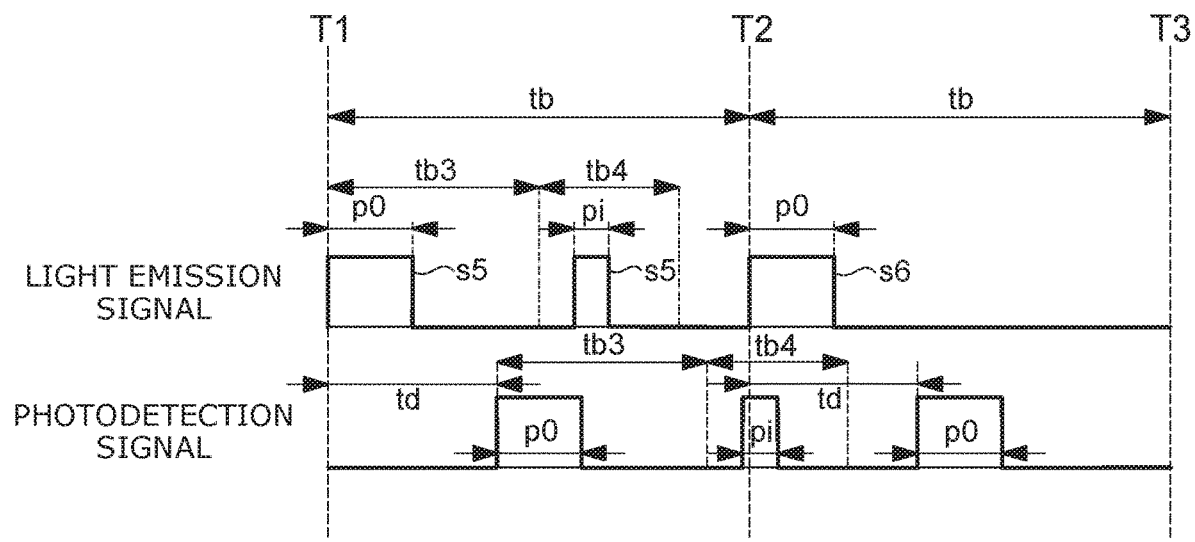
FIG. 9 is a timing chart illustrating a light emission signal emitted by a light emitting element and a photodetection signal received by a photodetection element, where the light emitting element and the photodetection element are both elements of an electro-optical distance meter of a fourth embodiment.

FIG. 9 is a timing chart illustrating a light emission signal emitted by the light emitting element 11 and a photodetection signal received by the photodetection element 21, where the light emitting element and the photodetection element are both elements of an electro-optical distance meter of a fourth embodiment. As illustrated in FIG. 9, the timing signal generator 39 of the present embodiment outputs the first pulsed modulation signal s5 in a period from the end of the time interval tb3 from time point T1 to the end of the time interval tb4 in the period from a time point at which the output of the first pulsed modulation signal s5 emitted at time point T1 ends to a time point at which the output of the second pulsed modulation signal s6 starts.

As illustrated in FIG. 9, the reason why the first pulsed modulation signal s5 is output in the period from the end of the time interval tb3 from time point T1 to the end of the time interval tb4 is to use the first pulsed modulation signal s5 as the identification information indicating the host device. In the present embodiment, the period from the end of the time interval tb3 from time point T1 to the end of the time interval tb4 is set as an identification area, and the first pulsed modulation signal s5 included in the identification area is used as the identification information. Specifically, the position and the pulse width pi of the first pulsed modulation signal s5 included in the identification area are used as the identification information.

In the present embodiment, although the position and the pulse width pi of the first pulsed modulation signal s5 included in the identification area are used as the identification information, there is no limitation thereto. For example, only the position or only the pulse width pi of the first pulsed modulation signal s5 may be used as the identification information. Moreover, for example, the first pulsed modulation signal s5 of which the emission state and the non-emission state are switched may be output at a plurality of positions of the identification area and a combination of the position and the pulse width of the plurality of first pulsed modulation signals s5 may be used as the identification information. When the identification information is generated, the position, the pulse width pi, and the number of first pulsed modulation signals s5 may be generated randomly whenever distance measurement is executed.

Next, a process executed by the determining unit 47b when the photodetection element 21 receives the photodetection signal illustrated in FIG. 9 will be described.

In step S504 of FIG. 5, the determining unit 47b of the arithmetic processing unit 27 determines whether the identification information indicating the host device is included in the photodetection signal.

The determining unit 47b recognizes that a period from the end of the time interval tb and the time delay td from time point T1 to the time interval tb4 is an identification area and reads the photodetection signal received in the identification area from the memory 46. the determining unit 47b determines whether the position and the pulse width pi of the first pulsed modulation signal s5 included in the identification area are identical to the identification information indicating the host device and determines that the identification information indicating the host device is included in the photodetection signal when the position and the pulse width are identical to the identification information indicating the host device.

According to the electro-optical distance meter of the present embodiment, it is possible to output the light emission signal including the identification information using the period from the end of the output of the first pulsed modulation signal s5 to the start of the output of the second pulsed modulation signal s6 without changing the pulse widths of the first pulsed modulation signal s5 (the first distance measuring light) and the second pulsed modulation signal s6 (the second distance measuring light). With this configuration, it is possible to prevent a measurement error when another electro-optical distance meter is disposed at an adjacent position without deteriorating the distance measuring performance.

Hereinabove, the embodiments of the present invention have been described. However, the present invention is not limited to the above-described embodiments and various changes can be made without departing from the scope of the claims. The components of the embodiments may be omitted partially and may be combined arbitrarily so as to be different from the above.

The invention claimed is:

1. An electro-optical distance meter, comprising:
a light emitting element that emits a distance measuring light;
a signal generator that generates a first modulation signal modulated at a first frequency and a second modulation signal modulated at a second frequency adjacent to the first frequency;
a driving unit that drives the light emitting element on the basis of a first pulsed modulation signal obtained by pulsing the first modulation signal and a second pulsed modulation signal obtained by pulsing the second modulation signal and causes the light emitting element to switchably output a first distance measuring light modulated at the first frequency and a second distance measuring light modulated at the second frequency;
a photodetection element that receives a first reflected distance measuring light corresponding to the first distance measuring light reflected by a measurement target object and a second reflected distance measuring light corresponding to the second distance measuring light reflected by the measurement target object;
a frequency conversion unit that frequency-converts the first reflected distance measuring light received by the photodetection element to generate a first difference frequency signal and frequency-converts the second reflected distance measuring light received by the photodetection element to generate a second difference frequency signal having a phase difference corresponding to a distance to the measurement target object with respect to the first difference frequency signal, the frequency conversion unit comprising a timing signal generator that generates a timing signal for switching states between an emission state and a non-emission state of the first pulsed modulation signal and the second pulsed modulation signal;
an arithmetic unit that executes an arithmetic process of calculating a distance value to the measurement target object on the basis of the phase difference between the first difference frequency signal and the second difference frequency signal; and
a determining unit that determines whether identification information indicating a host device is included in a photodetection signal including the first distance measuring light and the second distance measuring light received by the photodetection element, wherein the driving unit drives the light emitting element so that the identification information is included in a light emission signal emitted by the light emitting element, the arithmetic unit executes the arithmetic process of calculating the distance value when the determining unit determines that the identification information is included in the photodetection signal, and the timing signal generator adjusts a timing at which the host device emits the light emission signal so that the timing at which the photodetection element receives the light emission signal emitted by the host device does not overlap a timing at which the photodetection element receives the light emission signal emitted by another device when the determining unit determines that the identification information is not included in the photodetection signal.

2. The electro-optical distance meter according to claim 1, wherein the driving unit outputs the first distance measuring light and the second distance measuring light alternately at predetermined time intervals and outputs an emission pattern including the identification information made up of a combination of a plurality of pulse widths of the first distance measuring light and a plurality of pulse widths of the second distance measuring light.

3. The electro-optical distance meter according to claim 1, wherein the driving unit outputs an emission pattern including the identification information made up of a combination of emission intervals of the first distance measuring light and the second distance measuring light.

4. The electro-optical distance meter according to claim 1, wherein the driving unit outputs the first distance measuring light and the second distance measuring light alternately at predetermined time intervals and outputs a light emission signal including the identification information in a period from the end of the output of the first distance measuring light to the start of the output of the second distance measuring light.

5. An electro-optical distance measurement method, comprising:

a signal generating step of generating a first modulation signal modulated at a first frequency and a second modulation signal modulated at a second frequency adjacent to the first frequency;

a light emitting step of driving a light emitting element on the basis of a first pulsed modulation signal obtained by pulsing the first modulation signal and a second pulsed modulation signal and switchably outputting a first distance measuring light modulated at the first frequency and a second distance measuring light modulated at the second frequency;

a photodetection step of allowing a photodetection element to receive a first reflected distance measuring light corresponding to the first distance measuring light reflected by a measurement target object and a second reflected distance measuring light corresponding to the second distance measuring light reflected by the measurement target object;

a frequency conversion step of frequency-converting the first reflected distance measuring light received in the photodetection step to generate a first difference frequency signal and frequency-converting the second reflected distance measuring light received in the photodetection step to generate a second difference frequency signal having a phase difference corresponding to a distance to the measurement target object with respect to the first difference frequency signal, the frequency conversion step comprising a timing signal generating step of generating a timing signal for switching states between an emission state and a non-emission state of the first pulsed modulation signal and the second pulsed modulation signal;

an arithmetic step of executing an arithmetic process of calculating a distance value to the measurement target object on the basis of the phase difference between the first difference frequency signal and the second difference frequency signal; and a determining step of determining whether identification information indicating a host device is included in a photodetection signal including the first distance measuring light and the second distance measuring light received by the photodetection element, wherein the light emitting step involves driving the light emitting element so that the identification information is included in a light emission signal emitted by the light emitting element, the arithmetic step involves executing the arithmetic process of calculating the distance value when it is determined in the determining step that the identification information is included in the photodetection signal, and the timing signal generating step involves adjusting a timing at which the host device emits the light emission signal so that the timing at which the photodetection element receives the light emission signal emitted by the host device does not overlap a timing at which the photodetection element receives the light emission signal emitted by another device when it is determined in the determining step that the identification information is not included in the photodetection signal.

* * * * *

UNITED STATES PATENT AND TRADEMARK OFFICE
CERTIFICATE OF CORRECTION

| | | |
|---|---|---|
| PATENT NO. | : 11,269,074 B2 | Page 1 of 1 |
| APPLICATION NO. | : 16/544846 | |
| DATED | : March 8, 2022 | |
| INVENTOR(S) | : Shoji et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 218 days.

Signed and Sealed this
Seventh Day of February, 2023

Katherine Kelly Vidal
*Director of the United States Patent and Trademark Office*